United States Patent
Malley et al.

(10) Patent No.: US 7,244,320 B2
(45) Date of Patent: Jul. 17, 2007

(54) METHODS FOR REPAIRING GAS TURBINE ENGINE COMPONENTS

(75) Inventors: David R. Malley, Bolton, CT (US); Carl E. Kelly, Plantsville, CT (US); Robert P. Schaefer, Vernon Rockville, CT (US)

(73) Assignee: United Technologies Corporation, Hartford, CT (US)

( * ) Notice: Subject to any disclaimer, the term of this patent is extended or adjusted under 35 U.S.C. 154(b) by 372 days.

(21) Appl. No.: 10/858,365

(22) Filed: Jun. 1, 2004

(65) Prior Publication Data

US 2005/0263220 A1 Dec. 1, 2005

(51) Int. Cl.
*C22C 30/00* (2006.01)
*C21D 1/70* (2006.01)
*C22F 1/16* (2006.01)

(52) U.S. Cl. ............... 148/419; 148/442; 148/707; 148/516; 148/537

(58) Field of Classification Search ........... 148/419, 148/586, 707, 442, 516, 537; 420/586; 72/53; 29/90.7
See application file for complete search history.

(56) References Cited

U.S. PATENT DOCUMENTS 4,750,944 A * 6/1988 Snyder et al. ............ 148/522
5,549,767 A 8/1996 Pietruska et al.
5,922,150 A 7/1999 Pietruska et al.
6,049,979 A * 4/2000 Nolan et al. ............ 29/889.1
6,531,005 B1 3/2003 Bezerra et al.

* cited by examiner

Primary Examiner—Deborah Yee
(74) Attorney, Agent, or Firm—Tracey R. Loughlin

(57) ABSTRACT

Systems and methods for repairing Thermo-Span® gas turbine engine components are described herein. Embodiments of these methods minimize post-weld residual stresses in a weld repaired Thermo-Span® component by solution heat treating the component by heating the component to about 2000° F.±25° F., holding the component at about 2000° F.±25° F. for about one hour; and cooling the component to below about 700° F. at a rate equivalent to cooling in air; and precipitation heat treating the component by heating the component to about 1325° F.±25° F., holding the component at about 1325° F.±25° F. for about 8 hours, cooling the component to about 1150° F.±25° F. at a maximum rate of about 100° F./hour, holding the component at about 1150° F.±25° F. for about 8 hours, and cooling the component at a predetermined cooling rate. Dimensions of the fully-machined and weld repaired component are maintained during solution heat treating and precipitation heat treating via custom designed furnace tools.

25 Claims, 3 Drawing Sheets

FIG.1
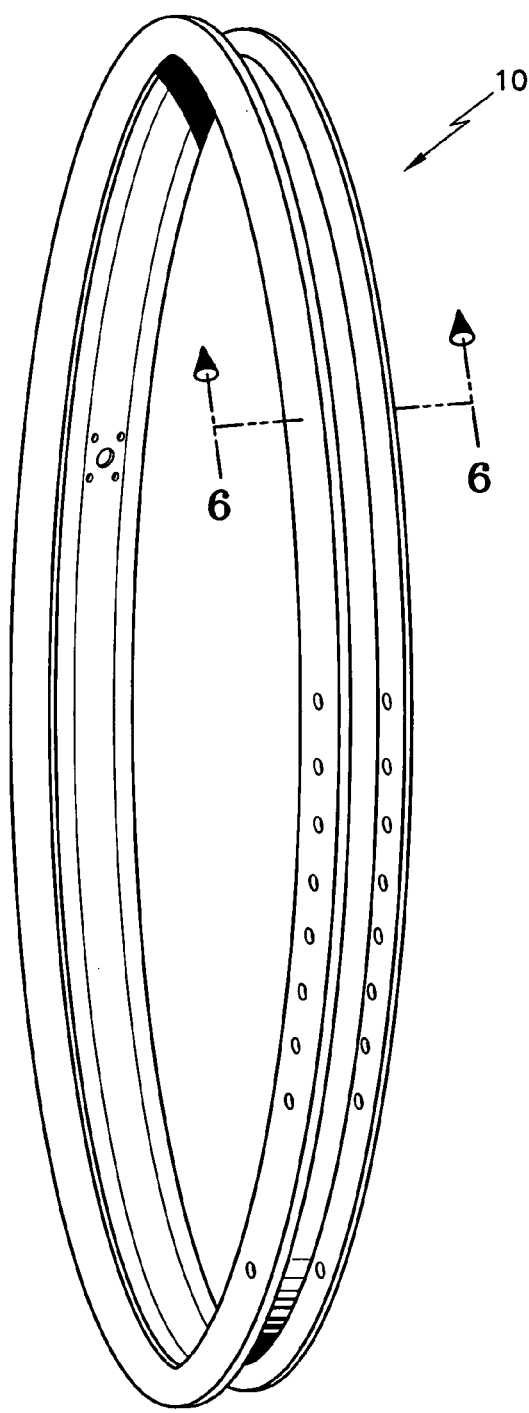
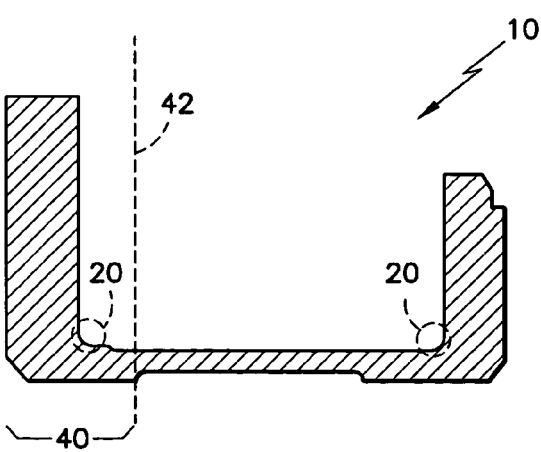
FIG.6

METHODS FOR REPAIRING GAS TURBINE ENGINE COMPONENTS

FIELD OF THE INVENTION

The present invention relates generally to the repair of gas turbine engines. More specifically, the present invention relates to methods for repairing Thermo-Span® gas turbine engine components, wherein, after the repair, the fully-machined component is solution heat treated to relieve residual weld stresses therein, and then precipitation heat treated to restore the microstructure and mechanical properties of the material to their typical fully heat treated conditions.

BACKGROUND OF THE INVENTION

A relatively new alloy being used in aero applications is an iron-nickel-cobalt-based superalloy available from Carpenter Technology Corporation, known commercially as Thermo-Span® material, which has uniquely low thermal expansion characteristics over a broad temperature range. Thermo-Span® material offers several advantages over the mainstay alloys typically used in aero applications, making this superalloy highly attractive for various aero applications, such as, for example, for components in the high and low compressor sections of various gas turbine engines, where close control of the compressor blade and wear strip materials is required to assure compressor efficiency and stability. While this superalloy provides better corrosion resistance, improved thermal stability, good tensile properties, excellent creep resistance, and better microstructural stability as compared to traditional iron-nickel-cobalt-based controlled expansion alloys, this superalloy also has some drawbacks. Namely, Thermo-Span® material suffers from relatively poor notched mechanical properties (i.e. stress-rupture, dwell low cycle fatigue, etc.) at elevated temperatures, and typically requires a coating (i.e., a low temperature diffused aluminide coating) thereon to protect it from environmental effects. The presence of such coatings can further degrade the notched properties of the Thermo-Span® material, potentially allowing Thermo-Span® components to crack in service. This cracking is typically observed at highly stressed areas where stress concentration characteristics aggravate the material's notch sensitivity, such as at hole locations.

While various methods exist for repairing gas turbine engine components made of traditional mainstay alloys, there are currently no methods available for repairing gas turbine engine components made of Thermo-Span® material. Therefore, damaged Thermo-Span® components must be replaced by an entirely new component, and the damaged Thermo-Span® components are being returned to the manufacturer or set aside until a suitable repair method becomes available for salvaging them. As the number of damaged Thermo-Span® components continues to grow, the costs associated with those damaged components continues to rise as well. As such, it would be very desirable to be able to repair damaged Thermo-Span® gas turbine engine components so that such components could be returned to useful service.

SUMMARY OF THE INVENTION

Accordingly, the above-identified shortcomings are overcome by embodiments of the present invention, which relates to systems and methods for repairing damaged Thermo-Span® gas turbine engine components. These systems and methods provide various methods for repairing Thermo-Span® gas turbine engine components, followed by solution heat treating and precipitation heat treating the fully-machined part, so that damaged Thermo-Span® components can be repaired and returned to useful service.

Embodiments of this invention comprise methods for minimizing post-weld residual stresses in a weld repaired component. These methods comprise: solution heat treating the weld repaired component by heating the weld repaired component to about 2000° F.±25° F., holding the weld repaired component at about 2000° F.±25° F. for about one hour; and cooling the weld repaired component to below about 700° F. at a rate equivalent to cooling in air; and precipitation heat treating the weld repaired component by heating the weld repaired component to about 1325° F.±25° F., holding the weld repaired component at about 1325° F.±25° F. for about 8 hours, cooling the weld repaired component to about 1150° F.±25° F. at a maximum rate of about 100° F./hour, holding the weld repaired component at about 1150° F.±25° F. for about 8 hours, and cooling the weld repaired component at a predetermined cooling rate, wherein the weld repaired component is made of an iron-nickel-cobalt-based superalloy. The iron-nickel-cobalt-based superalloy, commercially known as Thermo-Span®b material, comprises about 27.00-31.00 wt. % cobalt, 23.00-26.00 wt. % nickel, 5.00-6.00 wt. % chromium, 4.40-5.30 wt. % columbium/niobium, 0.65-1.10 wt. % titanium, 0.30-0.70 wt. % aluminum, 0.20-0.40 wt. % silicon, up to 0.50 wt. % manganese, up to 0.50 wt. % copper, up to 0.05 wt. % carbon, up to 0.015 wt. % phosphorus, up to 0.015 wt. % sulfur, up to 0.010 wt. % boron, with the balance comprising iron. These weld repaired components may comprise gas turbine engine components.

Dimensions of the fully-machined and weld repaired component are maintained during solution heat treating and precipitation heat treating via a custom designed furnace tool.

After solution heat treating, substantially all residual weld stresses in the weld repaired component are eliminated (i.e., the weld repaired component comprises a residual stress of about 30 ksi or less). After precipitation heat treating, the microstructure of the weld repaired component is substantially equivalent to a microstructure of the as-received iron-nickel-cobalt-based superalloy. After precipitation heat treating, mechanical properties of the weld repaired component are substantially equivalent to mechanical properties of the as-received iron-nickel-cobalt-based superalloy.

These methods may further comprise: removing any coating present oil the component prior to weld repairing the component; shot peening predetermined surfaces of the weld repaired component after solution heat treating and precipitation heat treating the weld repaired component, and/or coating predetermined surfaces of the weld repaired component with a predetermined coating after shot peening. The predetermined coating is preferably not applied to predetermined locations, such as at critical notched locations such as holes and the areas surrounding holes.

Embodiments of this invention also comprise methods for weld repairing an iron-nickel-cobalt-based superalloy component. These methods comprise: removing any coating present on the component; weld repairing the component in a predetermined manner; solution heat treating the component by heating the component to about 2000° F.±25° F., holding the component at about 2000° F.±25° F. for about one hour; and cooling the component to below about 700° F. at a rate equivalent to cooling in air; precipitation heat treating the component by heating the component to about 1325° F.±25° F., holding the component at about 1325° F.±25° F. for about 8 hours, cooling the component to about 11150° F.±25° F. at a maximum rate of about 100° F./hour, holding the component at about 1150° F.±25° F. for about 8 hours, and cooling the component at a predetermined cooling rate; shot peening predetermined surfaces of the component; and coating predetermined surfaces of the component with a predetermined coating, wherein dimensions of the component are maintained during solution heat treating and precipitation heat treating via a furnace tool, and wherein the iron-nickel-cobalt-based superalloy component comprises about 27.00-31.00 wt. % cobalt, 23.00-26.00 wt. % nickel, 5.00-6.00 wt. % chromium, 4.40-5.30 wt. % columbium/niobium, 0.65-1.10 wt. % titanium, 0.30-0.70 wt. % aluminum, 0.20-0.40 wt. % silicon, up to 0.50 wt. % manganese, up to 0.50 wt. % copper, up to 0.05 wt. % carbon, up to 0.015 wt. % phosphorus, up to 0.015 wt. % sulfur, up to 0.010 wt. % boron, with the balance comprising iron.

Weld repairing the component in a predetermined manner may comprise any suitable weld repairing technique, such as, for example, weld repair of at least one crack therein with weld wire, weld repair of at least one crack therein via a wedge replacement weld repair, and weld repair of at least one crack therein via a full flange replacement weld repair.

Embodiments of this invention also comprise repaired iron-nickel-cobalt-based superalloy components that have been subjected to: (a) weld repairing; (b) solution heat treating, which comprises heating the component to about 2000° F.±25° F., holding the component at about 2000° F.±25° F. for about one hour; and cooling the component to below about 700° F. at a rate equivalent to cooling in air; and (c) precipitation heat treating, which comprises heating the component to about 1325° F.±25° F., holding the component at about 1325° F.±25° F. for about 8 hours, cooling the component to about 1150° F.+25° F. at a maximum rate of about 100° F./hour, holding the component at about 1150° F.±25° F. for about 8 hours, and cooling the component at a predetermined cooling rate, wherein the iron-nickel-cobalt-based superalloy comprises about 27.00-31.00 wt. % cobalt, 23.00-26.00 wt. % nickel, 5.00-6.00 wt. % chromium, 4.40-5.30 wt. % columbium/niobium, 0.65-1.10 wt. % titanium, 0.30-0.70 wt. % aluminum, 0.20-0.40 wt. % silicon, up to 0.50 wt. % manganese, up to 0.50 wt. % copper, up to 0.05 wt. % carbon, up to 0.015 wt. % phosphorus, up to 0.015 wt. % sulfur, up to 0.010 wt. % boron, with the balance comprising iron.

Further features, aspects and advantages of the present invention will be readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which:

FIG. 1 is a schematic diagram showing an exemplary Thermo-Span® high pressure compressor case assembly that may be repaired according to methods of this invention;

FIG. 6 is a schematic diagram showing a cross-sectional view of the high pressure compressor case assembly shown in FIG. 1 taken along line 6-6.

DETAILED DESCRIPTION OF THE INVENTION

Figure 2:
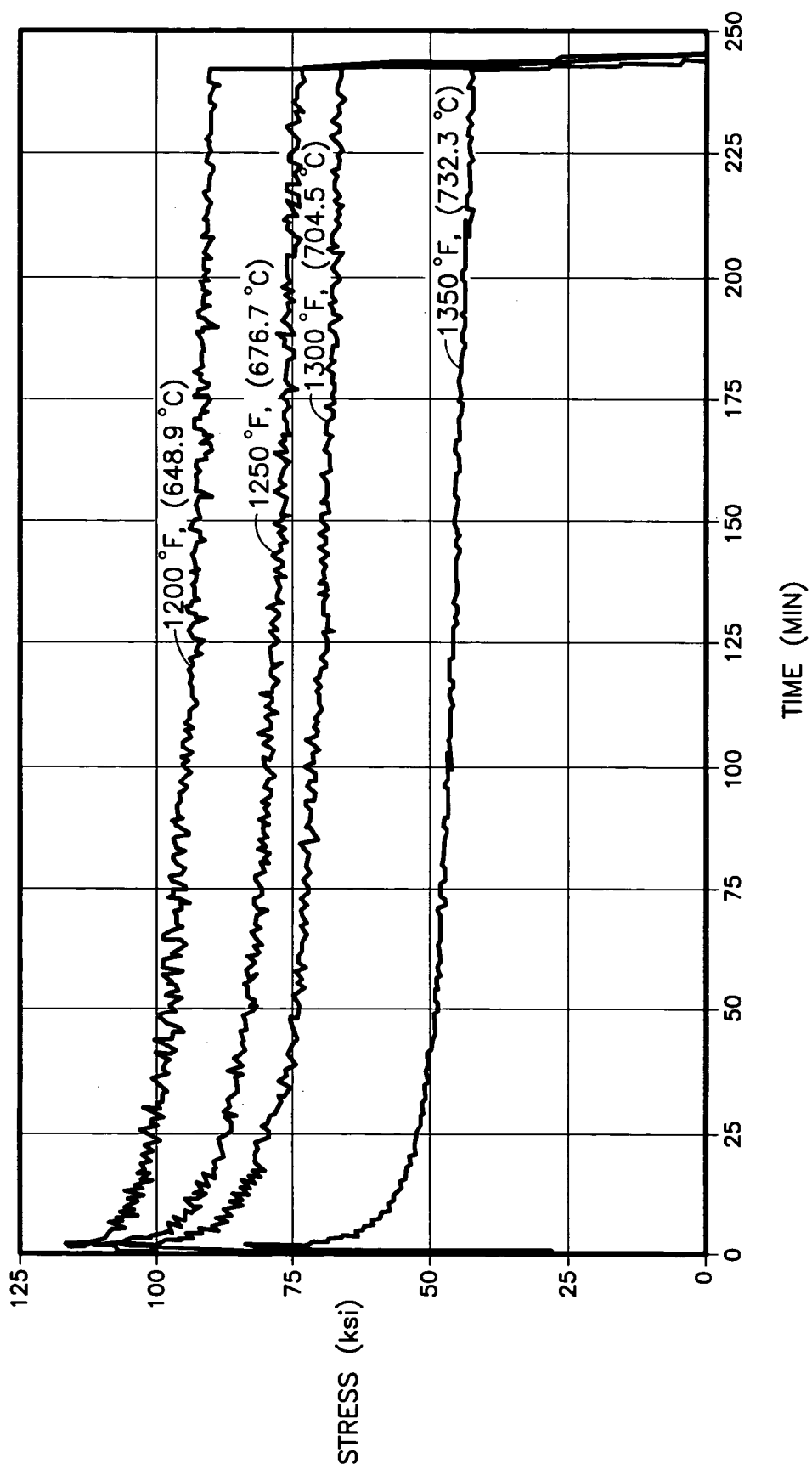
FIG. 2 is a graph showing stress relaxation data for Thermo-Span® components at various stress relieving times and temperatures.

For the purposes of promoting an understanding of the invention, reference will now be made to some preferred embodiments of this invention as illustrated in FIGS. 1-6 and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Any modifications or variations in the depicted structures and methods, and such further applications of the principles of the invention as illustrated herein, as would normally occur to one skilled in the art, are considered to be within the spirit and scope of this invention.

This invention relates to systems and methods for repairing damaged Thermo-Span® gas turbine engine components so that such components can be returned to useful service. Since suitable post-weld stress relieving cycles for Thermo-Span® components do not exist, it is necessary that the fully-machined Thermo-Span® components be subjected to a complete heat treatment after being weld repaired. This represents a significant departure from conventional practice, which avoids exposing fully-machined parts to solution heat treatment temperatures. However, this invention utilizes custom designed furnace tooling, which allows adequate dimensional control of the fully-machined Thermo-Span® parts to be maintained during the complete heat treatment cycle of this invention.

Thermo-Span® material is an iron-nickel-cobalt-based controlled expansion superalloy. Thermo-Span® material typically comprises about 27.00-31.00 wt. % cobalt, 23.00-26.00 wt. % nickel, 5.00-6.00 wt. % chromium, 4.40-5.30 wt. % columbium/niobium, 0.65-1.10 wt. % titanium, 0.30-0.70 wt. % aluminum, 0.20-0.40 wt. % silicon, up to 0.50 wt. % manganese, up to 0.50 wt. % copper, up to 0.05 wt. % carbon, up to 0.015 wt. % phosphorus, up to 0.015 wt. % sulfur, up to 0.010 wt. % boron, with the balance comprising iron. This superalloy possesses an excellent combination of tensile properties and stress rupture strength in the recrystallized condition with the use of common solution and age hardening treatments. Compared to traditional iron-nickel-cobalt-based controlled expansion alloys, Thermo-Span® material provides better corrosion resistance, improved thermal stability, good tensile properties, and resistance to hydrogen embrittlement if processed to a fine grain size.

Thermo-Span® material also offers excellent creep resistance and microstructural stability throughout the full operating temperature range of various engine compressors. Furthermore, unlike other iron-nickel-cobalt-based controlled expansion alloys, Thermo-Span® material contains chromium, which provides a level of oxidation resistance that was previously unattainable in conjunction with low thermal expansion. In short, Thermo-Span® gas turbine engine components allow improved performance, longer component life, and lower life cycle costs to be realized.

As previously noted, gas turbine engine components are routinely repaired to return critical and/or expensive components to useful service. While various types of weld repairs are often used to repair such components, welding generates very high residual stresses in the repaired component due to the solidification reaction in the weld. These residual stresses can be nearly as high as the component alloy's yield stress, and can negatively impact a variety of properties, including stress-rupture, smooth and notched low cycle fatigue, and crack propagation behavior. Since repairs are frequently validated analytically by fatigue crack initiation and propagation techniques, the presence of residual stresses plays an important role in determining the acceptability of a repair. Consequently, reducing residual stresses is a key engineering consideration.

The typical approach to reducing weld-related stresses in a part is to stress relieve the part after a weld repair is made. Attempts to create a stress relief cycle that could be used on weld repaired Thermo-Span® parts were unsuccessful. Initially, the shortened precipitation heat treatment commonly used for post-welding stress relief of Inconel Alloy 718 was tried in an attempt to stress relieve weld repaired Thermo-Span® parts. This heat treatment cycle consisted of heating the part to about 1350±25° F., holding the part at about 1350±25° F. for about 4 hours, cooling the part to about 1200±25° F. at a rate of about 125° F./hour maximum, holding the part at about 1200±25° F. for a time which, including the cooling time from 1350±25° F., totals about 3 hours, and then subsequently cooling the part to room temperature. This heat treatment cycle was selected because both Thermo-Span® material and Inconel Alloy 718 have similar precipitation heat treatment cycles. However, this heat treatment cycle was found to have highly negative effects on the mechanical properties of Thermo-Span® material.

Thermo-Span® components subjected to the shortened precipitation heat treatment just described showed significant debits in low strain creep and low cycle fatigue. Notched low cycle fatigue tests showed an average life of 10,800 cycles to failure for the base, unrepaired Thermo-Span® material versus 8,400 cycles to failure for the repaired and stress-relieved Thermo-Span® material. This represents a 22% life debit. Smooth low cycle fatigue tests showed an average life of 18,200 cycles to failure for the base, unrepaired Thermo-Span® material versus 8,000 cycles to failure for the repaired and stress-relieved Thermo-Span® material. This represents a 56% life debit. It appeared that these debits were caused by overaging of the Thermo-Span® material. Unlike Inconel Alloy 718, which can be subjected to this shortened precipitation heat treatment repeatedly with little or no detriment, Thermo-Span® material is fully aged during the first precipitation (i.e., aging) heat treatment cycle. Therefore, subjecting the Thermo-Span® material to even this shortened precipitation heat treatment for post-weld stress relief overaged the material, and resulted in the debits described above. These debits were considered structurally unacceptable for use in many applications, such as in the rear-most stages of certain high pressure compressors.

Therefore, additional work was performed in an attempt to develop an effective stress relief cycle for weld repaired Thermo-Span® components. An effective stress relief cycle would: (1) produce an acceptable level of residual stress (i.e., about 30 ksi maximum), and (2) not compromise the alloy's properties to an unacceptable degree. Stress relaxation testing was performed over a temperature range of about 1200-1350° F. to determine the minimum stress relief temperature that would produce an acceptable level of residual stress of about 30 ksi or less. The results shown in FIG. 1 show that the maximum acceptable residual stress of about 30 ksi was not even attained at 1350° F., the highest temperature tested. Since increasing the stress relieving temperature above 1350° F. would only create further property debits, an effective post-weld stress relief cycle is not feasible for Thermo-Span® components. Consequently, a novel approach was required in order to establish a repair for Thermo-Span® components so that such components could be returned to useful service in gas turbine engines.

As previously noted, after a Thermo-Span® component is weld repaired, post-welding stress relief is required before the component can be returned to useful service. In that regard, embodiments of this invention comprise novel heat treatments that allow post-weld residual stress relief in Thermo-Span® components to be achieved by solution heat treating the fully-machined and weld repaired Thermo-Span® components to relieve residual weld stresses therein, and then precipitation heat treating the components to restore the material's microstructure and mechanical properties to their typical as-received conditions.

The solution heat treatment of this invention consists of heating the part to about 2000±25° F., holding the part at about 2000±25° F. for about 1 hour, and cooling the part to below about 700° F. at a rate equivalent to air cooling. This is a standard solution heat treatment for Thermo-Span® material, and it eliminates virtually all the residual weld stresses in the Thermo-Span® components. Thereafter, the components are precipitation heat treated.

The precipitation heat treatment of this invention consists of heating the part to about 1325±25° F., holding the part at about 1325±25° F. for about 8 hours, cooling the part to about 1150±25° F. at a rate of about 100° F./hour maximum, holding the part at about 1150±25° F. for about 8 hours, and then subsequently cooling the part to room temperature at any desirable cooling rate. This is a standard precipitation heat treatment for Thermo-Span® material, and it restores the microstructure and mechanical properties of the material to their typical as-received conditions.

The heat treatments of this invention require the use of custom-designed furnace tooling to maintain adequate dimensional control of the fully-machined Thermo-Span® parts during heat treating. These fixtures preferably have a different coefficient of thermal expansion than the Thermo-Span® component so that the fixture can size the component. This sizing preferably occurs during heating, rather than during cooling. This differential thermal expansion fixturing concept involves calculating the relative sizes of the components and the fixture so that the two can come together at the appropriate temperature to constrain the component from distorting.

Various types of weld repairs can be made to Thermo-Span® components. These repairs comprise weld wire repairs of minor cracks, wedge replacement repairs for more serious cracks, and full flange replacement repairs for the most serious cracks. These repairs may be used to repair various Thermo-Span® components, such as, for example, a full hoop ring component 10 of a high pressure compressor case assembly, as shown in FIGS. 1 and 3-6.

Figure 3:
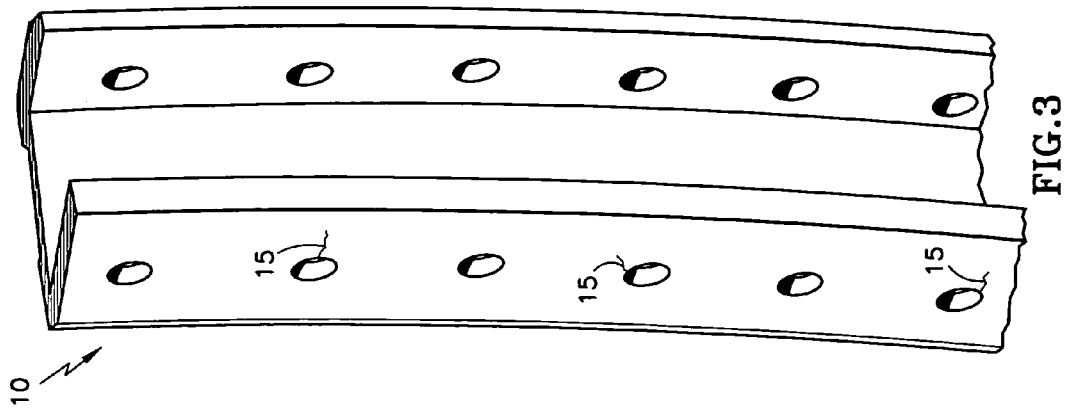
FIG. 3 is a schematic diagram showing a top perspective view of a portion of the high pressure compressor case assembly shown in FIG. 1, showing some exemplary cracks that can be weld repaired via weld wire repair methods of this invention.

Weld wire may be used to repair minor cracks in Thermo-Span® components, such as the cracks 15 shown in FIG. 3. These cracks 15 are typically minor surface cracks that do not extend into sensitive areas (i.e., cracks that do not extend into the inner radius area 20 of the exemplary full hoop ring component 10). Such cracks 15 are typically repaired by: (1) removing any coating that exists on the component 10; (2) using a router or other suitable tool to remove the crack 15, taking care to remove the minimum amount of material possible while doing so; (3) inspecting the area to ensure the crack 15 has been fully removed; (4) cleaning the area that will be welded; (5) utilizing weld wire to weld the area; and then (6) heat treating the weld repaired component to relieve residual weld stresses therein.

Figure 4:
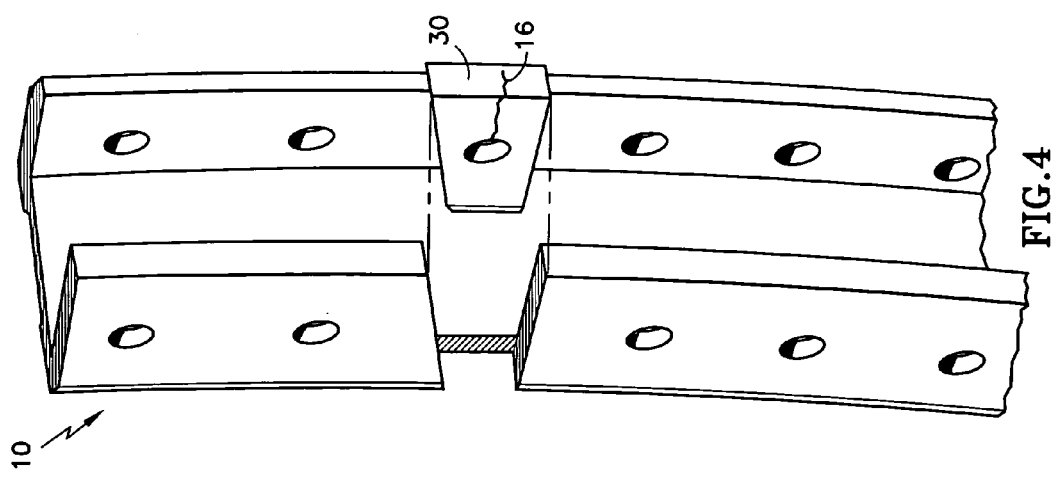
FIG. 4 is a schematic diagram showing a top perspective exploded view of a portion of the high pressure compressor case assembly shown in FIG. 1, showing an exemplary crack that can be repaired via wedge replacement repair methods of this invention.

Wedge replacement repairs may be used for repairing more serious cracks in Thermo-Span® components. One such crack 16 that may be repaired via the wedge replacement repair methods of this invention is shown in FIG. 4. These cracks 16 are typically more serious cracks, such as deeper cracks or cracks that occur at hole locations. Such cracks 16 are typically repaired by: (1) removing any coating that exists on the component 10; (2) removing a wedge-shaped section 30 of the component 10 that contains the crack 16; (3) cleaning a newly-fabricated wedge replacement section and any areas that are to be welded; (4) replacing the damaged wedge-shaped section 30 with the newly-fabricated wedge replacement section; (5) welding the wedge replacement section into place, using weld wire if necessary or desired; and then (6) heat treating the weld repaired component to relieve residual weld stresses therein.

Figure 5:
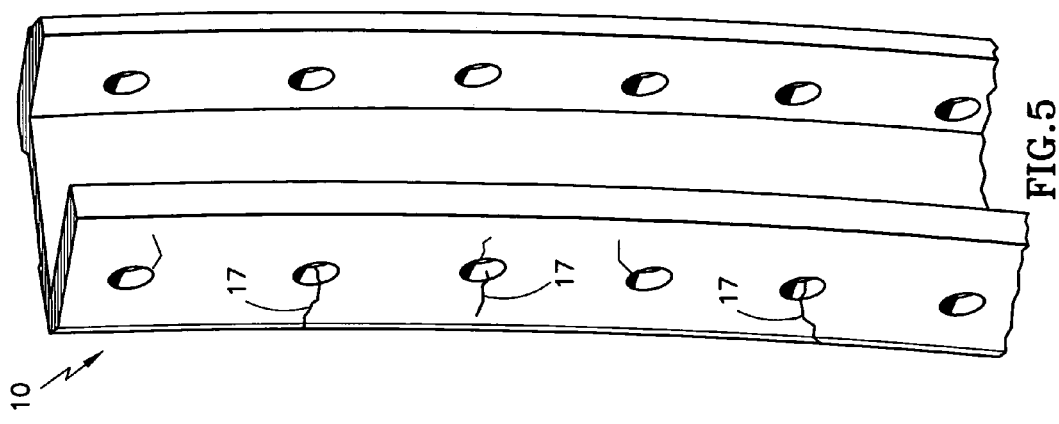
FIG. 5 is a schematic diagram showing a top perspective view of a portion of the high pressure compressor case assembly shown in FIG. 1, showing multiple exemplary cracks that can be repaired via full flange replacement repair methods of this invention.

Full flange replacement repairs may be used for repairing the most serious cracks in Thermo-Span® components. Several such cracks 17 that may be repaired via the full flange replacement repair methods of this invention are shown in FIG. 5. These cracks 17 are typically the most serious cracks because they propagate radially inward on the part, or there are too many cracks present within a given area of a part to make a wedge repair feasible. Such cracks 17 are typically repaired by: (1) removing any coating that exists on the component 10; (2) removing a full flange 40 of the component 10 that contains the cracks 17 (i.e., removing the flange 40 along cut line 42); (3) cleaning a newly-fabricated flange replacement and any areas that are to be welded; (4) replacing the damaged flange 40 with the newly-fabricated flange replacement; (5) welding the flange replacement into place, using weld wire if necessary or desired; and then (6) heat treating the weld repaired component to relieve residual weld stresses therein.

After one of the above-described weld repairs, or any other suitable weld repair, is made to a Thermo-Span® component, the novel heat treating step of this invention comprises subjecting the fully-machined and weld repaired part to the solution heat treatment described above, which comprises heating the part to about 2000±25° F., holding the part at about 2000±25° F. for about 1 hour, and cooling the part to below about 700° F. at a rate equivalent to air cooling. Thereafter, the part is subjected to the precipitation heat treatment described above, which comprises heating the part to about 1325±25° F., holding the part at about 1325±25° F. for about 8 hours, cooling the part to about 1150±25° F. at a rate of about 100° F./hour maximum, holding the part at about 1150±25° F. for about 8 hours, and then subsequently cooling the part to room temperature at any desirable cooling rate. Custom-designed furnace tooling is used to maintain adequate dimensional control of the fully-machined Thermo-Span® part during the solution heat treating and precipitation heat treating steps of this invention. The two-step heat treatment of this invention is not limited to use after one of the weld repairs described above. This two-step heat treatment may be performed after any type of weld repair is made to a Thermo-Span® component to relieve residual weld stresses in the weld repaired part. Furthermore, while repairs to full hoop ring components of a high pressure compressor case assembly made of Thermo-Span® material are described herein, this invention is not limited to repairing such components. Any Thermo-Span® component can be weld repaired and then heat treated according to the novel two-step heat treatment of this invention without deviating from the spirit and scope of this invention. Additionally, the two-step heat treatment of this invention, or other similar heat treatments, can be applied to other low coefficient of thermal expansion iron-nickel-cobalt-based alloys besides Thermo-Span® materials.

When weld wire is used in the repairs of this invention, any suitable weld wire may be used. While Thermo-Span® weld wire would be the most preferable weld wire, no such weld wire currently exists or is planned. As such, other suitable weld wire must be used. Since the majority of heat treatable nickel-based superalloys require heat treatments that are incompatible with Thermo-Span® material, this weld wire may be selected from the non-hardenable nickel-based alloys. In embodiments, a heat treatable Inconel Alloy 909 weld wire may be preferred because its thermal expansion properties are close to those of Thermo-Span® material, and it would provide greater mechanical strength than non-heat treatable alloys. In other embodiments, a heat treatable Inconel Alloy 718 weld wire may be preferred because it would also provide greater mechanical strength than non-heat treatable alloys, and the limited amount of weld material that would be used would have a minimal effect on the component's overall thermal expansion characteristics. Some other suitable, non-limiting weld wires comprise Inconel Alloy 625 and Haynes Alloy 242.

Weld repairs in this invention may comprise any suitable welding technique, such as, for example, manual gas tungsten arc welding, manual plasma arc welding, electron beam welding, etc.

After the repairs and heat treatments of this invention are performed, shot peening of the surface of the component may be performed to improve the notched and smooth low cycle fatigue strength, as well as the notched stress-rupture strength, of the component. Fatigue is created by engine vibrations, and fatigue cracks typically start on the surface of a component at points of tensile stresses. Shot peening creates compressive residual stresses on the surface of the component, which increases the fatigue life of the component Therefore, shot peening is advantageous. As such, full shot peening is ideally present in any holes, in the hole entry/exit radii, over the welds themselves, and over adjacent heat-affected zones, as well as in any other desirable locations. While original Thermo-Span® components generally do not comprise shot peened surfaces, shot peening after weld repairing such parts can actually provide a level of improved low cycle fatigue therein that is not present in original Thermo-Span® components.

The limited oxidation resistance of Thermo-Span® material at temperatures above about 1000° F. requires that a coating be used on such components if they will be operated above such temperatures. While many various coatings are possible, one preferred coating is a low temperature diffused aluminide coating. This coating is generally applied to the component after weld repair, heat treatment and shot peening, via a diffusion-controlled process, at temperatures between about 950-1025° F. for approximately 17 hours. The presence of such aluminum-based coatings significantly reduces the component's notched dwell fatigue strength potential. Since Thermo-Span® components tend to crack in service due to insufficient notched properties, these coatings should not be applied to critical notched locations, such as, for example, at hole locations. The presence of attachment features, such as bolts, partially reduces the engine operating temperature and oxygen access in such holes. Therefore, oxidation should not be a problem in uncoated holes.

As described above, this invention provides systems and methods for repairing Thermo-Span® gas turbine engine components. Advantageously, the heat treatment methods of this invention allow such weld repaired components to be returned to useful service. Custom designed furnace tooling allows adequate dimensional control of the fully-machined components to be maintained during the heat treatment cycle. Many other embodiments and advantages will be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A method for minimizing post-weld residual stresses in a weld repaired component, comprising:
    solution heat treating the weld repaired component by heating the weld repaired component to about 2000° F.±25° F., holding the weld repaired component at about 2000° F.±25° F. for about one hour; and cooling the weld repaired component to below about 700° F. at a rate equivalent to cooling in air; and
    precipitation heat treating the weld repaired component by heating the weld repaired component to about 1325° F.±25° F., holding the weld repaired component at about 1325° F.±25° F. for about 8 hours, cooling the weld repaired component to about 1150° F.±25° F. at a maximum rate of about 100° F./hour, holding the weld repaired component at about 1150° F.±25° F. for about 8 hours, and cooling the weld repaired component,
    wherein the weld repaired component is made of an iron-nickel-cobalt-based superalloy comprising about 27.00-31.00 wt. % cobalt 23.00-26.00 wt .% nickel, 5.00-6.00 wt. % chromium, 4.40-5.30 wt. % columbium/niobium, 0.65-1.10 wt. % titanium, 0.30-0.70 wt. % aluminum 0.20-0.40 wt. % silicon, up to 0.50 wt. % manganese, up to 0.50 wt. % copper, up to 0.05 wt. % carbon, up to 0.015 wt. % phosphorus, up to 0.015 wt. % sulfur, up to 0.010 wt. % boron, with the balance comprising iron, and wherein dimensions of the weld repaired component are maintained during solution heat treating and precipitation heat treating via a furnace tool.

2. The method of claim 1, wherein the weld repaired component is a fully-machined component.

3. The method of claim 1, wherein alter solution heat treating and precipitation heat treating, the weld repaired component comprises a residual stress of about 30 ksi or less.

4. The method of claim 1, wherein after precipitation heat treating, the microstructure of the weld repaired component is substantially equivalent to a microstructure of the as-received iron-nickel-cobalt-based superalloy.

5. The method of claim 1, wherein after precipitation heat treating, mechanical properties of the weld repaired component are substantially equivalent to mechanical properties of the as-received iron-nickel-cobalt-based superalloy.

6. The method of claim 1, further comprising
    shot peening at least a portion of at least one surface of the weld repaired component after solution heat treating and precipitation heat treating the weld repaired component.

7. The method of claim 6, further comprising:
    coating at least a portion of at least one surface of the weld repaired component after shot peening.

8. The method of claim 7, wherein the coating is not applied to the entire component.

9. The method of claim 8, wherein the coating is not applied in or proximate holes in the component.

10. The method of claim 1, wherein the weld repaired component comprises a gas turbine engine component.

11. A method for repairing an iron-nickel-cobalt-based superalloy component, comprising:
    weld repairing the component,
    solution heat treating the component by heating the component to about 2000° F.±25° F., holding the component at about 2000° F.±25° F. for about one hour; and cooling the component to below about 700° F. at a rate equivalent to cooling in air; and
    precipitation heat treating the component by heating the component to about 1325° F.±25° F., holding the component at about 1325° F.±25° F. for about 8 hours, cooling the component to about 1150° F.±25° F. at a maximum rate of about 100° F./hour, holding the component at about 1150° F.±25° F. for about 8 hours, and cooling the component,
    wherein the weld repaired component is made of an iron-nickel-cobalt-based superalloy comprising about 27.00-31.00 wt. % cobalt, 23.00-26.00 wt. % nickel, 5.00-6.00 wt. % chromium, 4.40-5.30 wt. % columbium/niobium, 0.65-1.10 wt. % titanium, 0.30-0.70 wt. % aluminum, 0.20-0.40 wt. % silicon, up to 0.50 wt. % manganese, up to 0.50 wt. % copper, up to 0.05 wt. % carbon, up to 0.015 wt. % phosphorus, up to 0.015 wt. % sulfur, up to 0.010 wt. % boron, with the balance comprising iron, and wherein dimensions of the component are maintained during solution heat treating and precipitation heat treating via a furnace tool.

12. The method of claim 11, wherein the component is a fully-machined component.

13. The method of claim 11, wherein weld repairing the component comprises at least one of the following methods: weld repairing at least one crack therein with weld wire, weld repairing at least one crack therein via a wedge replacement weld repair, and weld repairing at least one crack therein via a full flange replacement weld repair.

14. The method of claim 11, further comprising:
    shot peening at least a portion of at least one surface of the component after solution heat treating and precipitation heat treating the component.

15. The method of claim 14, further comprising:
coating at least a portion of at least one surface of the component after shot peening.

16. The method of claim 15, wherein the coating is not applied to the entire component.

17. The method of claim 16, wherein the coating is not applied in or proximate holes in the component.

18. The method of claim 11, wherein after solution heat treating and precipitation heat treating, the component comprises a residual stress of about 30 ksi or less.

19. The method of claim 11, wherein after precipitation heat treating, the microstructure of the component is substantially equivalent to a microstructure of the as-received iron-nickel-cobalt-based superalloy.

20. The method of claim 11, wherein after precipitation heat treating, mechanical properties of the component are substantially equivalent to mechanical properties of the as-received iron-nickel-cobalt-based superalloy.

21. The method of claim 11, further comprising removing any coating present on the component prior to weld repairing the component.

22. The method of claim 11, wherein the component comprises a gas turbine engine component.

23. A method for weld repairing an iron-nickel-cobalt-based superalloy component, comprising:
removing any coating from the component;
weld repairing the component;
solution heat treating the component by heating the component to about 2000° F.±25° F., holding the component at about 2000° F.±25° F. for about one hour; and cooling the component to below about 700° F. at a rate equivalent to cooling in air;
precipitation heat treating the component by heating the component to about 1325° F.±25° F., holding the component at about 1325° F.±25° F. for about 8 hours, cooling the component to about 1150° F.±25° F. at a maximum rate of about 100° F./hour, holding the component at about 1150° F.±25° F. for about 8 hours, and cooling the component;
shot peening at least a portion of at least one surface of the component; and
coating at least a portion of at least one surface of the component,
wherein dimensions of the component are maintained during solution heat treating and precipitation heat treating via a furnace tool, and wherein the iron-nickel-cobalt-based superalloy component comprises about 27.00-31.00 wt. % cobalt, 23.00-26.00 wt. % nickel, 5.00-6.00 wt. % chromium, 4.40-5.30 wt. % columbium/niobium, 0.65-1.10 wt. % titanium, 0.30-0.70 wt. % aluminum, 0.20-0.40 wt. % silicon, up to 0.50 wt. % manganese, up to 0.50 wt. % copper, up to 0.05 wt. % carbon, up to 0.015 wt. % phosphorus, up to 0.015 wt. % sulfur, up to 0.010 wt. % boron, with the balance comprising iron.

24. The method of claim 23, wherein the component comprises a gas turbine engine component.

25. A repaired iron-nickel-cobalt-based superalloy component that has been subjected to:
i. weld repairing;
ii. solution heat treating, which comprises heating the component to about 2000° F.±25° F., holding the component at about 2000° F.±25° F. for about one hour; and cooling the component to below about 700° F. at a rate equivalent to cooling in air; and
iii. precipitation heat treating, which comprises heating the component to about 1325° F.±25° F., holding the component at about 1325° F.±25° F. for about 8 hours, cooling the component to about 1150° F.±25° F. at a maximum rate of about 100° F./hour, holding the component at about 1150° F.±25° for about 8 hours, and cooling the component,
wherein the iron-nickel-cobalt-based superalloy comprises about 27.00-31.00 wt. % cobalt, 23.00-26.00 wt. % nickel, 5.00-6.00 wt. % chromium, 4.40-5.30 wt. % columbium/niobium, 0.65-1.10 wt. % titanium, 0.30-0.70 wt. % aluminum, 0.20-0.40 wt. % silicon, up to 0.50 wt. % manganese, up to 0.50 wt. % copper, up to 0.05 wt. % carbon, up to 0.015 wt. % phosphorus, up to 0.015 wt. % sulfur, up to 0.010 wt. % boron, with the balance comprising iron.

* * * * *